US006755517B2

(12) United States Patent
Jones et al.

(10) Patent No.: US 6,755,517 B2
(45) Date of Patent: Jun. 29, 2004

(54) ALIGNMENT FEATURE FOR SOLID INK STICK

(75) Inventors: Brent R. Jones, Tualatin, OR (US); Frederick T. Mattern, Portland, OR (US); Barry D. Reeves, Lake Oswego, OR (US); Timothy L. Crawford, Saint Paul, OR (US); James D. Rise, Lake Oswego, OR (US)

(73) Assignee: Xerox Corporation, Stamford, CT (US)

(*) Notice: Subject to any disclaimer, the term of this patent is extended or adjusted under 35 U.S.C. 154(b) by 94 days.

(21) Appl. No.: 10/135,089

(22) Filed: Apr. 29, 2002

(65) Prior Publication Data

US 2003/0202078 A1 Oct. 30, 2003

(51) Int. Cl.$^7$ .................................................. G01D 11/00
(52) U.S. Cl. ............................................ 347/99; 347/88
(58) Field of Search ............................. D18/56; 347/88, 347/99, 84, 85

(56) References Cited

U.S. PATENT DOCUMENTS

| | | | | |
|---|---|---|---|---|
| 5,455,604 A | 10/1995 | Adams et al. | .............. | 346/138 |
| 5,510,821 A | 4/1996 | Jones et al. | .................... | 347/88 |
| D380,771 S | 7/1997 | Jones | .......................... | D18/56 |
| D392,651 S | 3/1998 | Ishii | ............................ | D18/56 |
| 5,734,402 A | 3/1998 | Rousseau et al. | ............. | 347/88 |
| 5,805,191 A | 9/1998 | Jones et al. | ................. | 347/103 |
| 5,861,903 A | 1/1999 | Crawford et al. | ............. | 347/88 |
| D416,936 S * | 11/1999 | Chin et al. | ................... | D18/56 |

FOREIGN PATENT DOCUMENTS

EP 0 703 085 A2 3/1996

OTHER PUBLICATIONS

Jones et al., "Feed Guidance and Identification for Ink Stick," U.S. patent application Ser. No. 10/135,156, filed concurrently herewith.

Jones, "Solid Ink Stick With Identifiable Shape," U.S. patent application Ser. No. 10/135,034, filed concurrently herewith.

Jones et al., "Multiple Segment Keying For Solid Ink Stick Feed," U.S. patent application Ser. No. 10/135,085, filed concurrently herewith.

* cited by examiner

*Primary Examiner*—Hai Pham
*Assistant Examiner*—Lam Nguyen
(74) *Attorney, Agent, or Firm*—David J. Arthur

(57) ABSTRACT

An ink stick for use in a solid ink feed system of a phase change ink jet printer includes an ink stick body. Nesting elements are formed in the ink stick body for nesting the ink stick body with an adjacent ink stick body. One end surface of the ink stick body has a projecting nesting element, and the opposite end surface has a recessed nesting element having a complementary shape and position. When two ink sticks with such nesting elements abut one another in a feed channel of a solid ink feed system, the projecting nesting element of one ink stick fits into the recessed nesting element of the adjacent ink stick to reduce movement of the ink sticks relative to each other, and to reduce skewing of the ink sticks in the feed channel.

10 Claims, 10 Drawing Sheets

ALIGNMENT FEATURE FOR SOLID INK STICK

CROSS-REFERENCE TO RELATED APPLICATIONS

Reference is made to commonly-assigned copending U.S. patent application Ser. No. 10/135,156, U.S. Publication No. 20030202071 A1, entitled "Feed Guidance and Identification for Ink Stick," by Jones et al., U.S. patent application Ser. No. 10/135,034, U.S. Publication No. 20030202075 A1, entitled "Solid Ink Stick with Identification Shape," by Jones, U.S. application Ser. No. 10/135,085, U.S. Publication No. 20030202056 A1, entitled for "Multiple Segment Keying for Solid Ink Stick Feed," by Jones et al., all filed Apr. 29, 2002, the disclosures of which are incorporated herein.

The present invention relates generally to ink printers, the ink used in such ink printers, and the apparatus and method for feeding the ink into the printer.

BACKGROUND

Solid ink or phase change ink printers conventionally receive ink in a solid form, either as pellets or as ink sticks. A feed mechanism delivers the solid ink to a heater assembly, where the ink is melted into a liquid state for jetting onto a receiving medium.

Solid ink or phase change ink printers conventionally receive ink in a solid form and convert the ink to a liquid form for jetting onto a receiving medium. The printer receives the solid ink either as pellets or as ink sticks in a feed chute. With solid ink sticks, the solid ink sticks are either gravity fed or spring loaded through a feed channel of the feed chute toward a heater plate. The heater plate melts the solid ink into its liquid form. In a printer that receives solid ink sticks, the sticks are either gravity fed or spring loaded into a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al., describe exemplary systems for delivering solid ink sticks into a phase change ink printer.

SUMMARY

An ink stick for use in a solid ink feed system of a phase change ink jet printer has an ink stick body with a first end surface and a second end surface. The first and second end surfaces have non-planar contours that are complements of one another. In particular embodiments, the complementary shapes of the first and second end surfaces are such that the second end surface of an ink stick in the ink stick feed system nests with the first end surface of an adjacent ink stick in the feed system. Such nesting blocks movement of the adjacent ink sticks with respect to each other to control skewing of the ink sticks as they move along the ink stick feed channel.

A method of feeding two or more solid ink sticks in an ink stick feed channel of a phase change ink jet printer includes inserting first and second ink sticks into the feed channel. The first ink stick includes a leading end surface, a trailing end surface, and a trailing nesting element formed in the trailing end surface. The second ink stick includes a leading end surface, a trailing end surface, and a leading nesting element formed in the leading end surface. The first and second ink sticks are positioned in the feed channel so that the leading end surface of the second ink stick is adjacent the trailing end surface of the first ink stick, and the leading nesting element of the second ink stick is nested with the trailing nesting element of the first ink stick.

THE DRAWINGS

DETAILED DESCRIPTION

Figure 1:
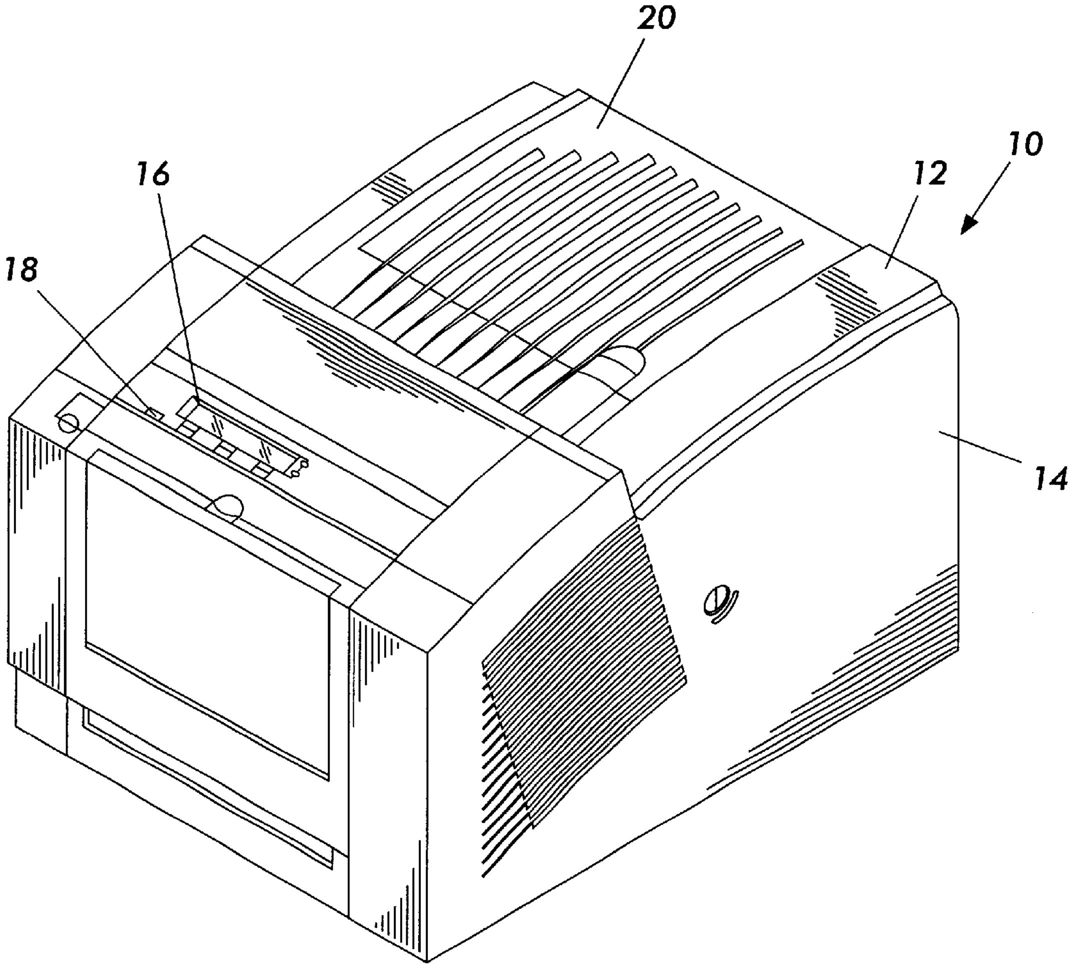
FIG. 1 is a perspective view of a phase change printer with the printer top cover closed.
Figure 2:
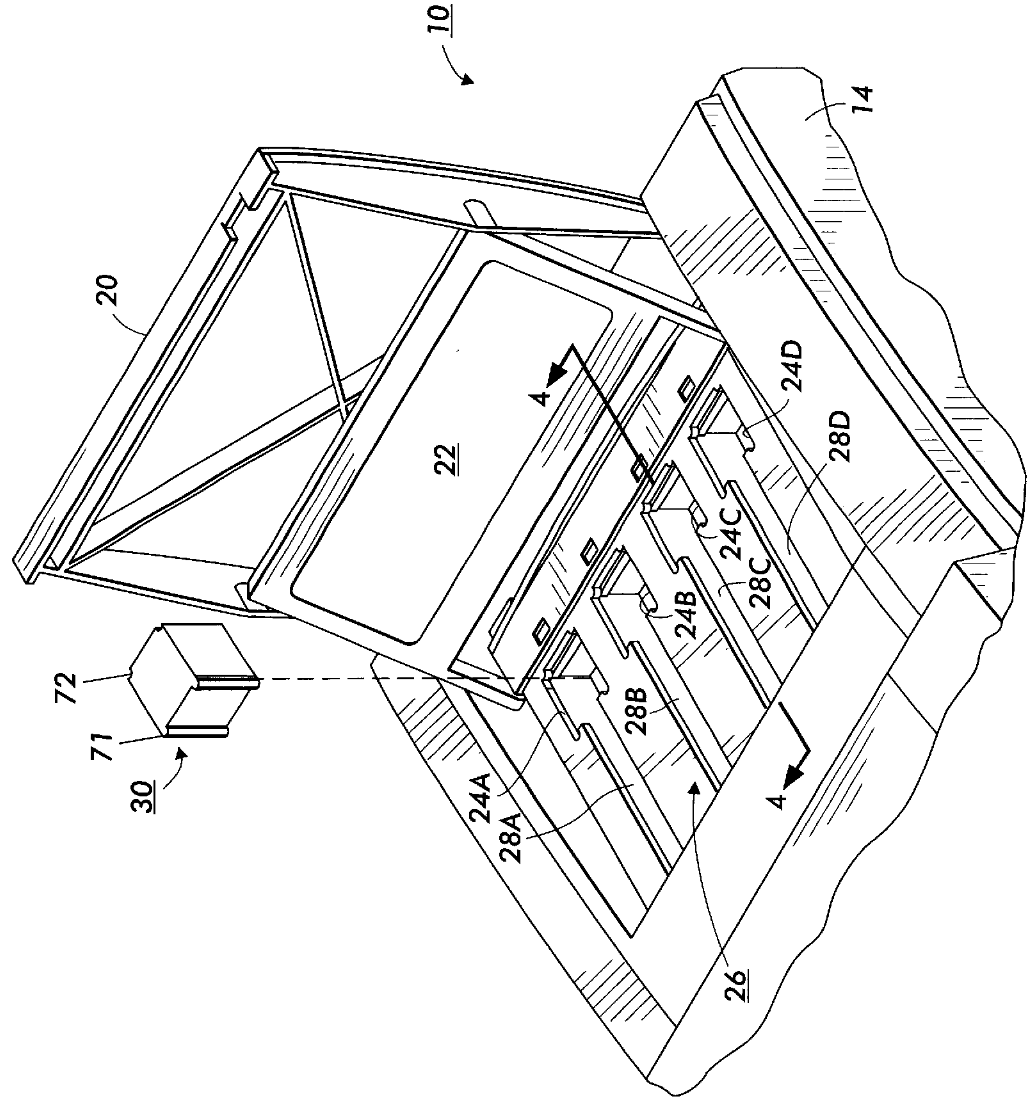
FIG. 2 is an enlarged partial top perspective view of the phase change printer with the ink access cover open, showing a solid ink stick in position to be loaded into a feed channel.
Figure 3:
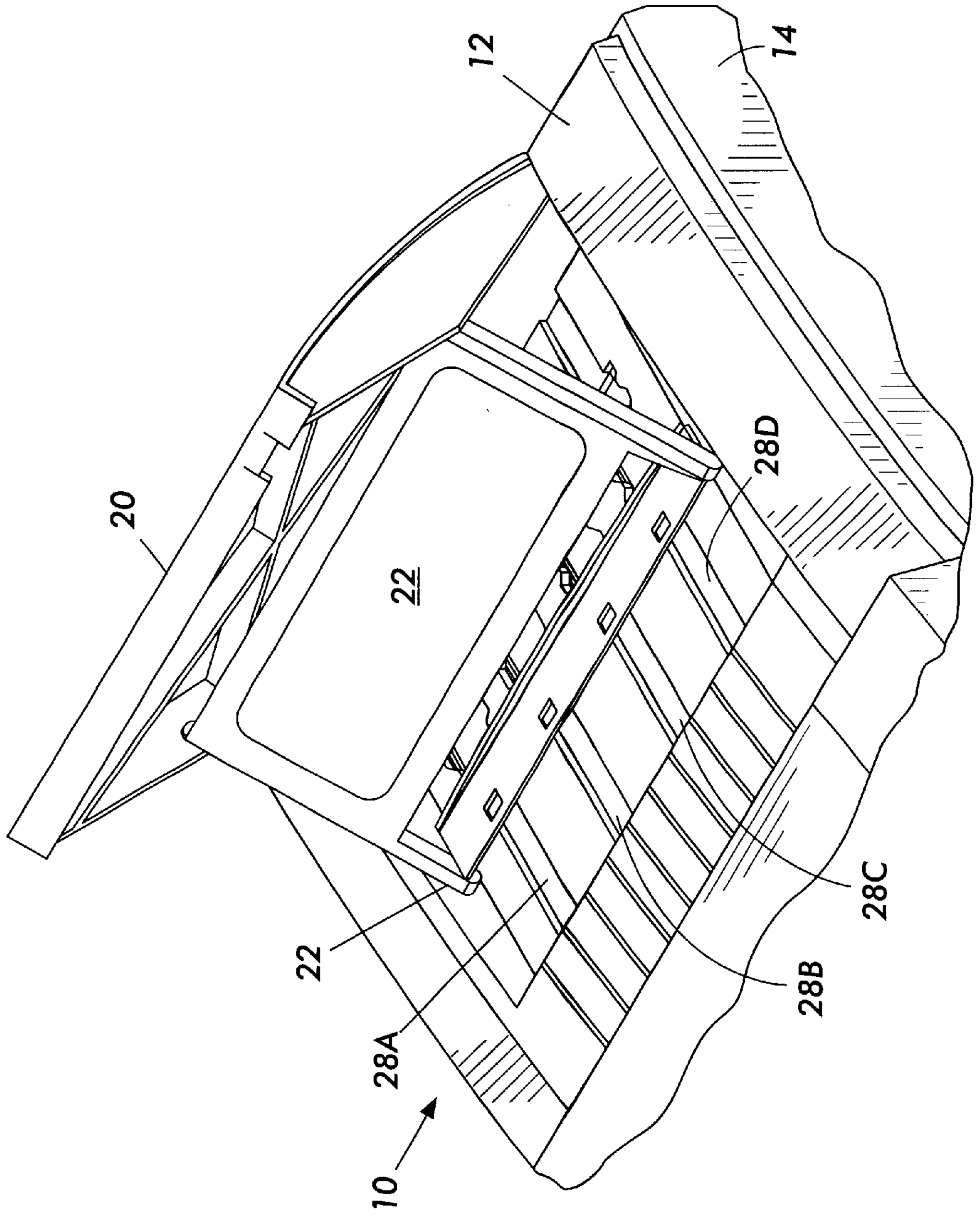
FIG. 3 is an enlarged partial top perspective view of the printer of FIG. 1 with the solid ink stick feed system cover partially closed.

Referring first to FIG. 1, a solid ink, or phase change ink printer 10 includes an outer housing having a top surface 12 and side surfaces 14. A user interface display, such as a front panel display screen 16 displays information concerning the status of the printer, and user instructions. Buttons 18 or other control elements may be adjacent the user interface window, or at other locations on the printer, to permit user interaction with the printer. The printing mechanism (not shown) is contained inside the housing. Such a printing mechanism is described in U.S. Pat. No. 5,805,191, entitled Surface Application System, to Jones et al., and U.S. Pat. No. 5,455,604, entitled Ink Jet Printer Architecture and Method, to Adams et al. An ink feed system delivers solid ink to the printing mechanism. The ink feed system may be contained under the top surface of the housing. The top surface of the housing includes a hinged top cover 20 that opens to reveal the ink feed system, as shown in FIGS. 2 and 3.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover 20 reveals a key plate 26 having keyed openings 24. Each keyed opening 24A, 24B, 24C, 24D provides access to an insertion end of one of several individual feed channels 28A, 28B, 28C, 28D of the solid ink feed system (see FIGS. 2, 3, and 4).

Figure 4:
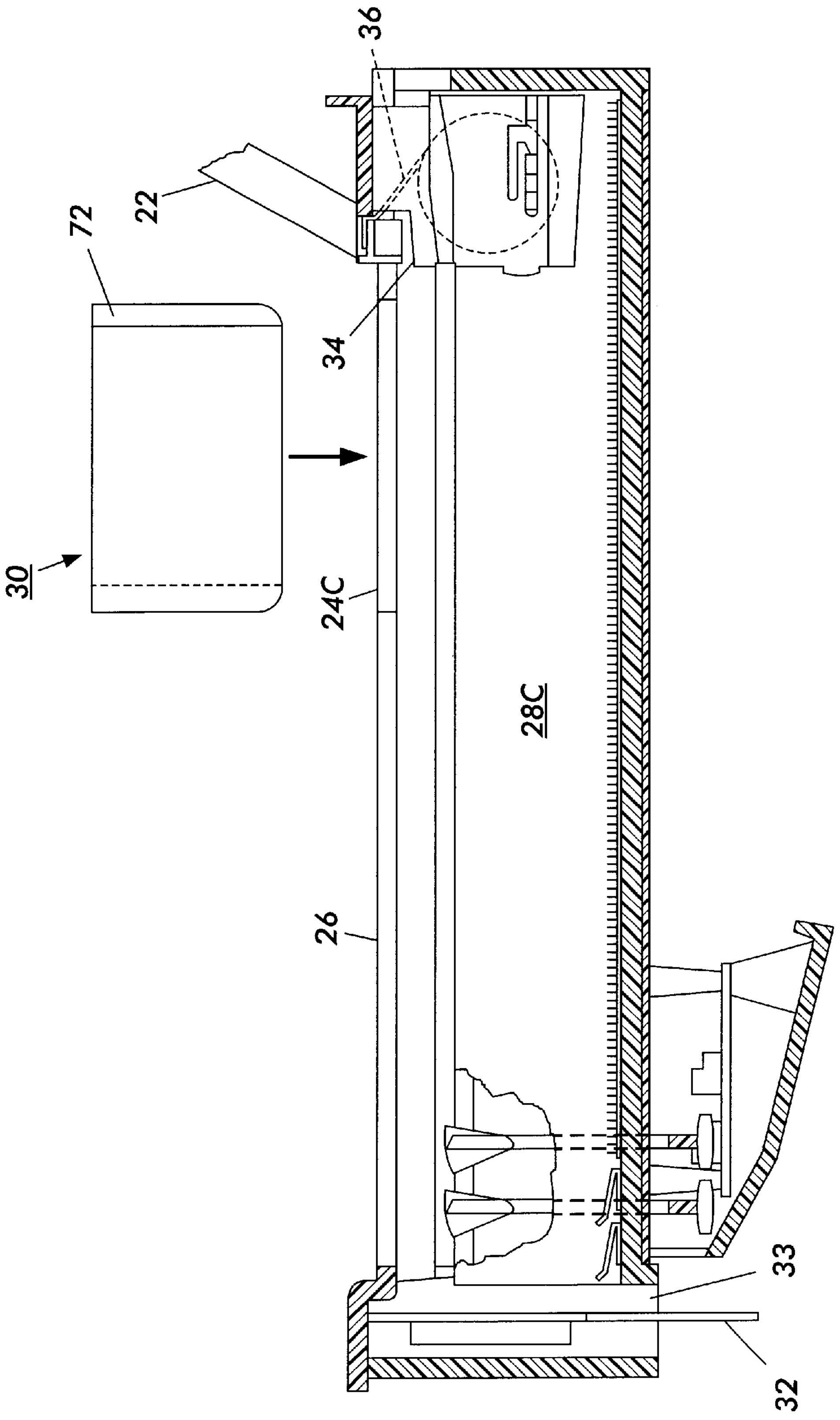
FIG. 4 is a side sectional view of a feed channel of a solid ink feed system, taken along line 4—4 of FIG. 2.
Figure 5:
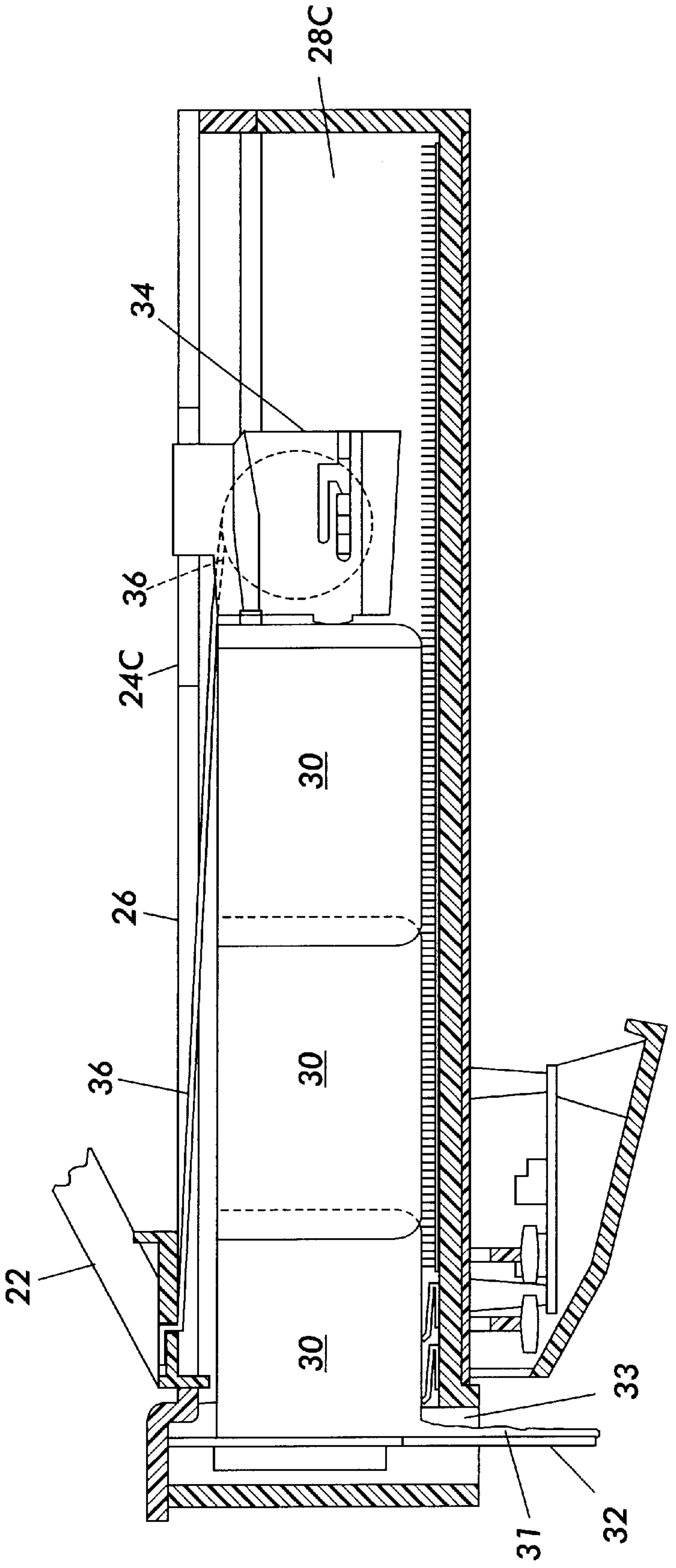
FIG. 5 is a side sectional view of the feed channel of FIG. 4 with ink sticks inserted into the feed channel and the ink load linkage closed.

Referring to FIG. 4, each feed channel 28 is a longitudinal feed channel designed to deliver ink sticks 30 of a particular color to a corresponding melt plate 32. Although the third feed channel 28C is shown in FIGS. 4 and 5, all the feed channels are identical for purposes of the following description. Each feed channel in the particular embodiment illustrated includes a push block 34 driven by a driving force or element, such as a constant force spring 36, to push the individual ink sticks 30 along the length of the longitudinal feed channel 28 toward the melt plates 32 that are at the melt end of each feed channel. FIG. 5 shows the arrangement of elements when the ink access cover 20 (FIGS. 1 and 2) is closed, and the ink load linkage element pulls the spring 36. The tension in the spring presses the push block 34 against the last ink stick (the ink stick closest to the insertion end of the feed channel).

The feed channel has a longitudinal dimension from the insertion end to the melt end, and a lateral dimension, substantially perpendicular to the longitudinal dimension. The feed channel receives ink sticks inserted at the insertion end. The feed channel has sufficient longitudinal length that multiple ink sticks can be inserted into the feed channel, as seen in FIG. 5. Each feed channel delivers ink sticks along the longitudinal length or feed direction of the channel to the corresponding melt plate at the melt end of the feed channel. The melt end of the feed channel is adjacent the melt plate. The melt plate melts the solid ink stick into a liquid form. The melted ink 31 drips through a gap 33 between the melt end of the feed channel and the melt plate, and into a liquid ink reservoir (not shown).

Figure 6:
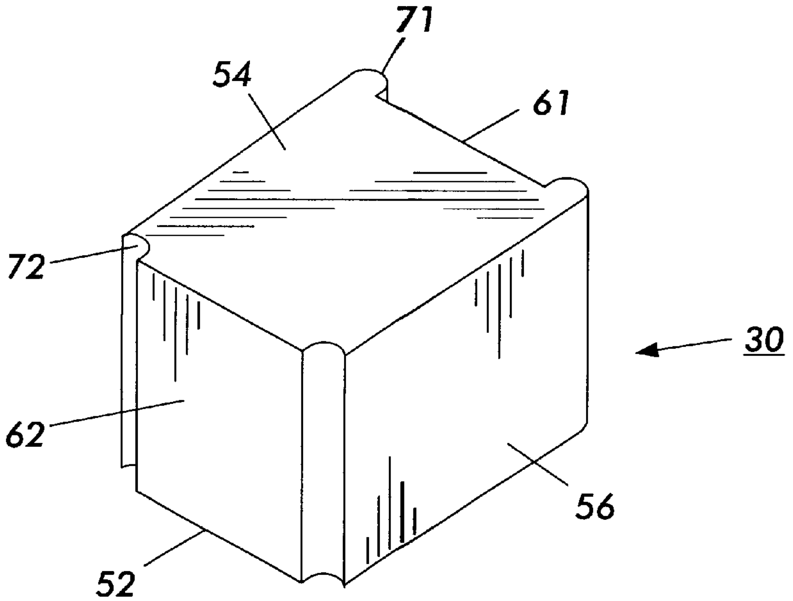
FIG. 6 is a perspective view of one embodiment of an ink stick.

FIG. 6 shows an ink stick 30 formed of an ink stick body. The ink stick body may be substantially rectangular in shape, although those familiar with the art will recognize that other shapes can also be used. The ink stick body may be formed by pour molding, compression molding, or other appropriate techniques. FIG. 6 shows one particular embodiment of an ink stick incorporating an alignment feature for enhancing the ability of ink sticks to maintain their proper alignment relative to one another in the feed channel of the solid ink feed system of the printer. The ink stick is illustrated without the key shapes on the lateral sides that correspond to the key plate openings 24 through the key plate 26, to simplify the illustration.

The particular embodiment shown includes a substantially rectangular ink stick body that has a bottom, represented by a general bottom surface 52, and a top, represented by a general top surface 54, which may be substantially parallel to the bottom surface. A pair of general lateral side extremities or side surfaces 56 connect the bottom surface 52 and the top surface 54. The surfaces of the ink stick body need not be flat, nor need they be parallel or perpendicular one another. However, these descriptions will aid the reader in visualizing, even though the surfaces may have three dimensional topography, or be angled with respect to one another. The lateral side surfaces 56 need not be planar. The lateral side surfaces can be stepped so that the lower portion of the ink stick body is narrower than the upper portion, or the upper portion is narrower than the lower portion. In addition, or in the alternative, the lateral side surfaces 56 can be shaped to provide a keying function. The key shaped lateral side surfaces correspond to the lateral edges of the keyed openings in the key plate to provide a unique match between each keyed opening and the corresponding ink sticks intended for insertion through that keyed opening and into that feed channel. The ink stick additionally includes a first end surface 61 and a second end surface 62. In the particular embodiment illustrated, the first and second end surfaces are substantially parallel to one another, and substantially perpendicular to both the top and bottom surfaces, and to the lateral side surfaces. However, after reading the following description, those skilled in the art will recognize that the first and second end surfaces need not be necessarily parallel to one another.

Figure 7:
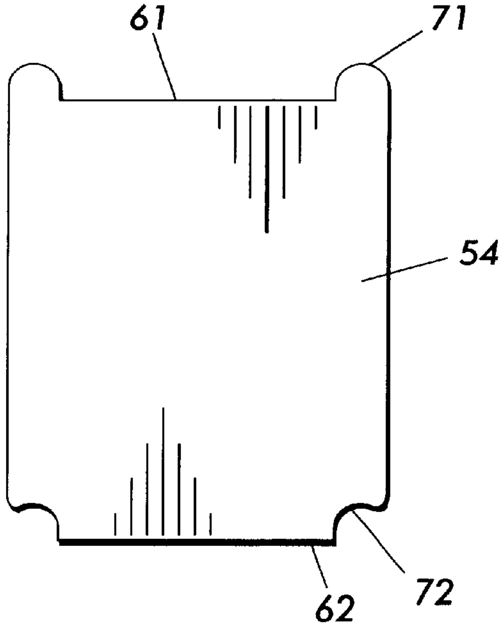
FIG. 7 is a top planar view of the ink stick of FIG. 6.

Referring to the views of FIGS. 6 and 7, the first and second end surfaces 61, 62 have complementary non-planar shapes or contours that provide nesting shapes or nesting elements 71, 72. These contours of the end surfaces 61, 62 may be defined by a plurality of straight lines connecting the top surface and the bottom surface along each of the end surfaces of the ink stick body. The contour of the first end surface forms one or more protruding nesting elements 71 extending from the face of the first end surface. The illustrated embodiment includes a pair of matching and symmetrically placed nesting elements 71 on the lateral outer portions of the first end surface. The protruding nesting elements illustrated extend uniformly along the entire height of the first end surface. However, the protruding nesting elements 71 may be segmented along the height of the first end surface, or may extend along only a portion of the height of the first end surface. The second end surface has recessed nesting elements 72 that have shapes complementary to the shapes of the protruding nesting elements 71 on the first end surface. The protruding nesting elements 71 on the first end surface of one ink stick can then are capable of nesting into the recessed nesting elements 72 of the second end surface of an adjacent ink stick when the ink sticks abut one another, such as when the ink sticks are stacked in the feed channel 28.

Figure 8:
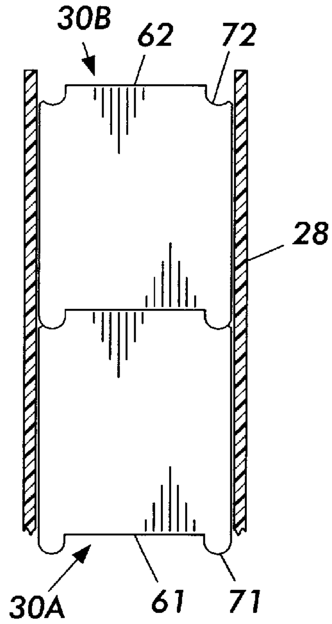
FIG. 8 is a top planar view of two adjacent ink sticks in a feed channel in an ink feed system.

Referring now to FIG. 8, two adjacent ink sticks in the ink feed channel 28 of the ink feed system are shown. The recessed nesting elements 72 of the contour of the second end surface 62 of a first ink stick 30A nest with the protruding nesting elements 71 of the contour on the first end surface 61 of the second ink stick 30B. the lateral sides of the protruding nesting elements 71 and recessed nesting elements 72 closely match one another to limit movement of the ink sticks relative one another. By limiting movement of the ink sticks with respect to one another, the ink sticks do not become skewed with respect to each other, or with respect to the feed channel, as the ink sticks travel along the length of the feed channel of the solid ink feed system. With the ink stick properly aligned with the feed channel, the ink stick meets the melt plate 32 normal to the melt plate surface. Proper alignment between the ink stick and the melt plate enhances even melting of the ink stick. Even melting reduces the formation of unmelted corner slivers at the trailing end of each ink stick. Such unmelted corner slivers may slip through the gap 70 between the melt plate and the end of the feed channel, potentially interfering with the proper functioning of certain portions of the printer (see FIGS. 4 and 5).

Key element shapes (not shown) in the lateral side surfaces 56 of the ink stick body may tend to affect the orientation of the ink stick body as the ink stick moves along the feed channel. The interaction of the nesting elements 71, 72 of the contoured end surfaces 61, 62 of adjacent ink sticks 30 counteracts that tendency, and maintains the correct orientation of the ink stick in the feed channel. The nesting of the protruding nesting elements 71 and the recessed nesting elements 72 of adjacent ink sticks reduce the "steering" effect of the push block 34 acting on the trailing end surface of the ink stick in the feed channel 28. Thus, laterally offset pressure by the pusher block is of lesser concern, and maintaining a perfect lateral balance of the force exerted by the push block on the ink stick is less critical than with certain other designs. Alignment of the ink sticks as they move along the feed channel also avoids jamming of the ink sticks due to showing of the ink sticks in the feed channel.

The ink sticks can be placed in the feed channel 28 with either the first end surface 61 as the leading end surface (meeting the melt plate 32 first), or the second end surface 62 as the leading end surface.

Referring again to FIG. 2, the perimeter of the keyed openings 24 can be formed to match the protruding and recessed nesting elements 71, 72 of the ink sticks. So matching the keyed openings with the nesting elements provides ink stick orientation control to ensure the printer operator consistently inserts the ink sticks in the correct direction.

Figure 9:
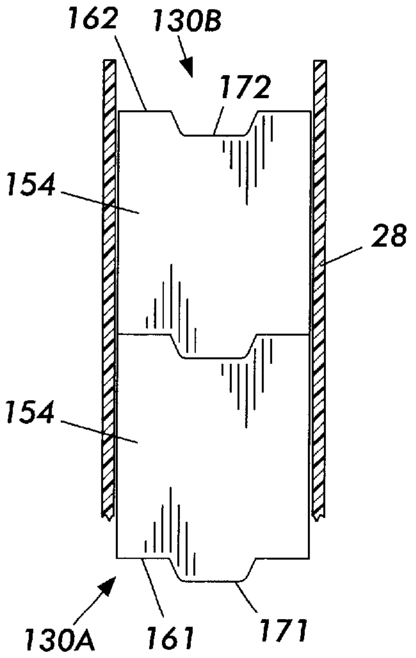
FIG. 9 is a top planar view of two adjacent ink sticks of a second embodiment of an aspect of the present invention.

Referring next to FIG. 9, an alternate embodiment of ink sticks 130 incorporating contoured first and second end surfaces 161, 162 is shown. The ink sticks are shown inserted in the feed channel to illustrate the nesting of a single central recessed nesting element 172 on the second end surface 162 of one ink stick 130A nests with a protruding nesting element 171 on the first end surface 162 of the adjacent ink stick 130B. In the embodiment illustrated in FIG. 9, the contour of the front and rear end surfaces are each formed by a plurality of substantially parallel straight lines connecting the top surface and the bottom surface along the front and end surfaces respectively, so that the protruding and recessed nesting elements 171, 172 extend along the entire height of the end surfaces 161, 162.

Figure 10:
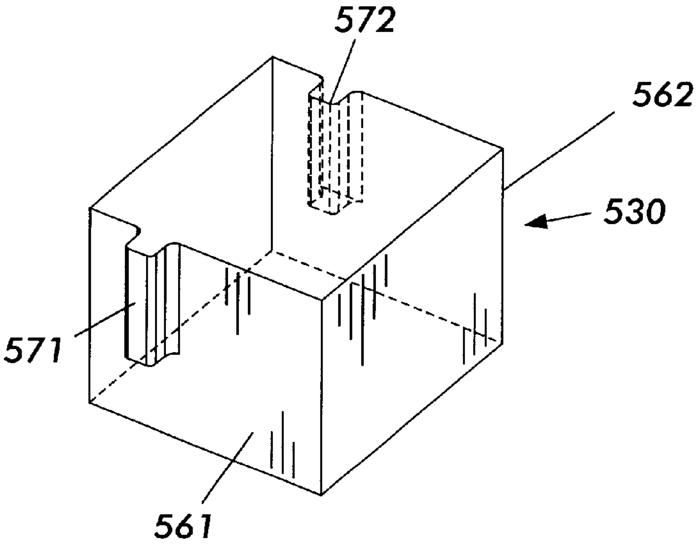
FIG. 10 is a perspective view of another embodiment of an ink stick.

FIG. 10 illustrates an embodiment of the ink stick in which the protruding nesting element 571 does not extend along the entire height of the end surface 561 of the ink stick body. The protruding nesting element illustrated extends along the upper portion of the end surface 561. The protruding nesting element can extend along the lower portion of the end surface as well. The corresponding recessed nesting element 572 extends along at least the same portion of the height of the second end surface 562 as the protruding nesting element extends on the first end surface 561. The recessed nesting element can extend along a greater portion of the height of the second end surface than does the protruding nesting element.

Figure 11:
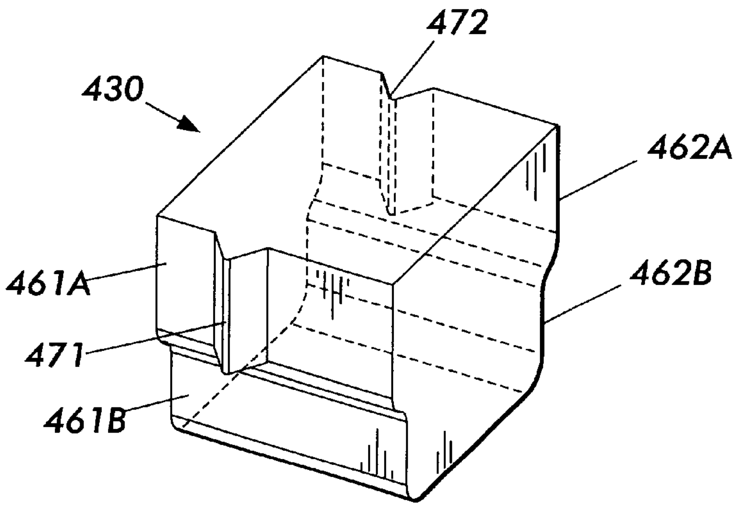
FIG. 11 is a perspective view of yet another embodiment of an ink stick.

FIG. 11 illustrates an embodiment of the ink stick in which the first and second end surfaces 461, 462 are each stepped or segmented. The protruding nesting element 471 extends along at least a segment 461A of the first end surface. A corresponding recessed nesting element 472 extends along a corresponding portion of a segment 462A of the second end surface. In the illustrated embodiment, the end surfaces 461, 462 are each formed with an outermost portion above an inner portion. The protruding and recessed nesting elements are formed in the outermost segments of the first and second end surfaces. Numerous other arrangements providing segmented end surfaces for the ink stick can also be used. In addition, the protruding and recessed nesting elements need not both be in the outermost segments of both end surfaces. The protruding and recessed nesting elements can be formed in other segments of the end surfaces that mate with one another when the ink sticks are placed adjacent one another, as in an ink feed channel. More than one nesting element may be used on each ink stick.

Figure 12:
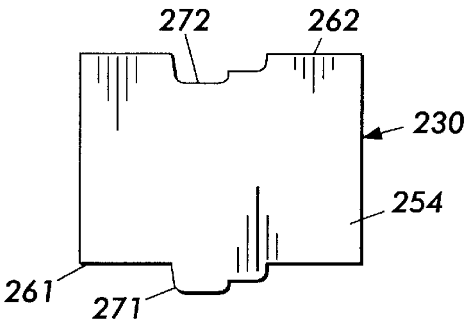
FIG. 12 is a top planar view of another embodiment of an ink stick.

FIG. 12 illustrates that the nesting elements may assume a variety of shapes. The shape of the protruding nesting element 271 on one end surface 261 substantially corresponds to and is the complement of the shape of the recessed nesting element 272 on the other end surface. Such complementary shaping maximizes the nesting capability, reducing movement of the ink sticks with respect to one another.

Figure 13:
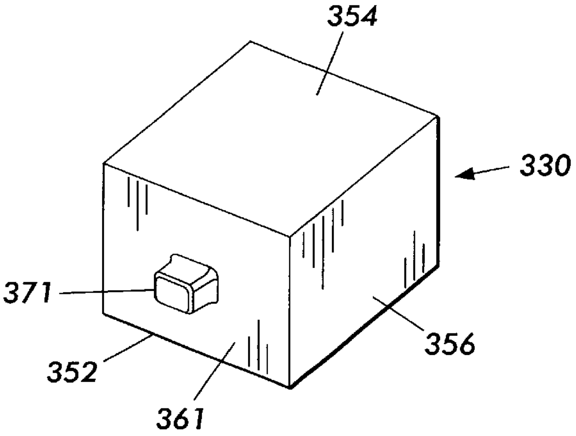
FIG. 13 is a perspective view of yet another embodiment of an ink stick.
Figure 14:
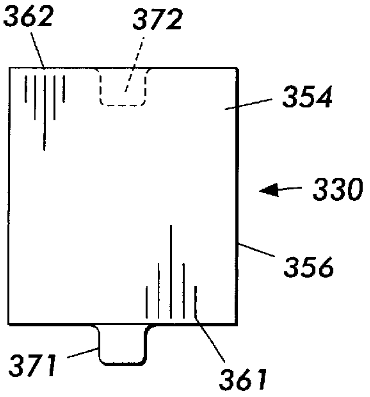
FIG. 14 is a top planar view of the ink stick of FIG. 13.

Yet another embodiment illustrated in FIGS. 13 and 14 illustrates that the contours of the first and second end surfaces 361, 362 could be formed of curved lines extending from the top of the ink stick to the bottom of the ink stick. The protruding nesting element 371 from the first end surface 361 of the ink stick does not extend along the entire height of the first end surface from the top surface to the bottom surface. The recessed nesting element 372 in the second end surface 362 can, but need not, extend along the entire height of the second end surface. The recessed nesting element 372 is at least as large as the protruding nesting element 371 so that the recessed nesting element can received the protruding nesting element of an adjacent ink stick. The recessed nesting element 372 has a position relative to the side surfaces 356 and to the bottom surface 352 of the ink stick body that corresponds with the position of the protruding nesting element 371. When the first and second end surfaces of adjacent ink sticks abut one another, the bottom surfaces of the adjacent ink sticks are substantially aligned, and the side surfaces of the adjacent ink sticks are also substantially aligned. The lateral dimensions of the recessed and projecting nesting elements are substantially identical, so that the interacting nesting elements block significant movement of the ink sticks relative to one another. Nesting elements could be subtle in size, so as to create frictional resistance to relative movement, rather than mechanical interlocking between adjacent ink sticks. Additionally, the nesting element may be configured to simultaneously include one or more portions that are recessed, and one or more portions that protrude from the same end surface.

Figure 15:
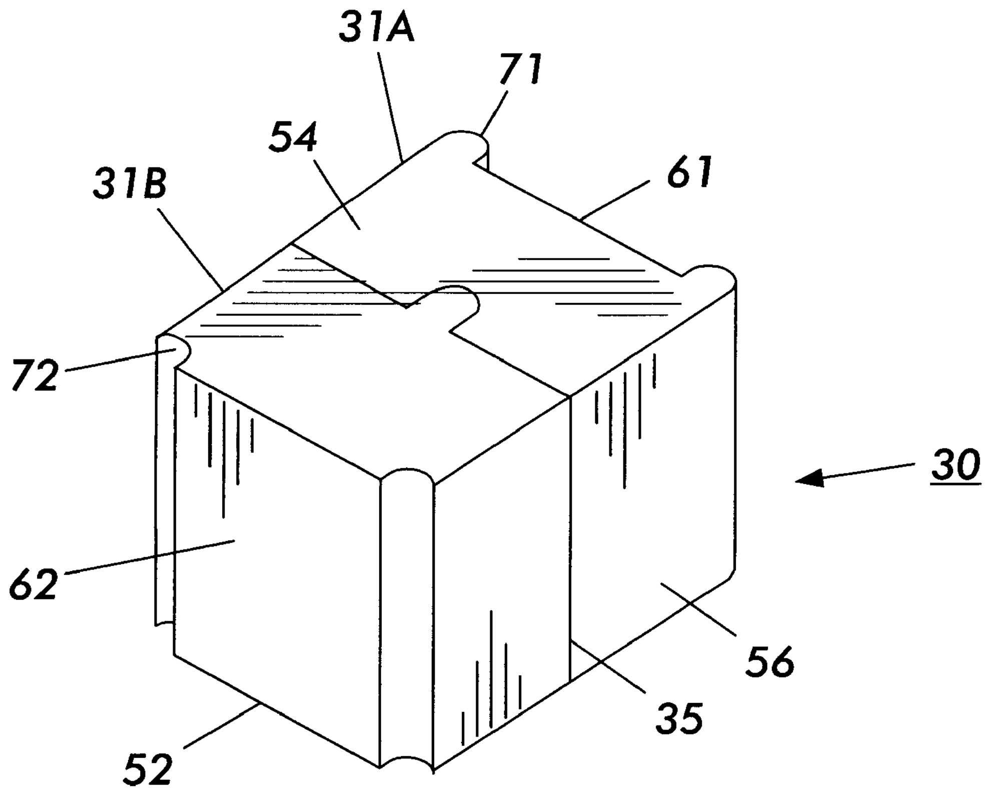
FIG. 15 is a perspective view of yet another embodiment of an ink stick.

In some instances, it may be beneficial to mold the ink stick in multiple sections, which sections can be assembled prior to inserting the ink stick into the feed channel. Such multi-piece ink sticks may be beneficial, for example, if the size of the ink stick is such that the ink stick body does not solidify consistently during the forming process. Referring to FIG. 15, the ink stick 30 is formed of two sections 31A, 31B that fit together at a joining line 35. The joining line is a substantially vertical cut through the ink stick body between the top and bottom surfaces 54, 52. The joining line of the illustrated embodiment intersects the lateral side surfaces 56 of the ink stick body, dividing the ink stick into longitudinal sections. The first longitudinal section 31A of the ink stick contains the first end surface 61 of the ink stick body, along with its protruding nesting element 71. The second longitudinal section 31B of the ink stick contains the second end surface 62 of the ink stick body, along with the recessed nesting element 72. Each section of the ink stick has a perimeter that includes a joint perimeter segment. The joint perimeter segments of the two ink stick sections 31A, 31B have complementary shapes. When the two ink stick sections are brought together with the joint perimeter segments abutting, they form the joining line 35.

The illustrated joining line 35 has a "puzzle cut" shape that provides a protrusion from one section of the ink stick that fits into a recess in the other section. The interaction of such a protrusion and recess helps to hold the two sections of the ink stick together as the printer operator inserts the assembled ink stick through the key plate opening 24 into the feed channel. The illustrated sections of the ink stick are substantially equal in size. However, other embodiments can have ink stick sections that are dissimilar in size. In addition, the ink stick can include more than two sections. The joining line can alternatively be between the top and bottom of the ink stick body, extend diagonally across the ink stick body, or longitudinally along the ink stick body, so that the joining line intersects the end surfaces 61, 62 of the ink stick body and divides the ink stick into lateral sections. In embodiments in which the joining line is longitudinal in the ink stick body, dividing the ink stick body into lateral sections, more than one section of the ink stick body can contain some aspects of the protruding nesting element 71, and more than one section of the ink stick body can contain some aspects of the recessed nesting element 72. In addition, one or more sections of the ink stick body can contain at least portions of both the protruding nesting element 71 and the recessed nesting element 72.

Those skilled in the art will recognize that corners and edges may have radii or other non-sharp configurations, depending on various factors, including manufacturing considerations. Those skilled in the art, upon reading this description will recognize that a variety of modifications may be made to the shapes of the ink sticks, including the shapes and configurations of the nesting elements, without departing from the spirit of the present invention. For example, different numbers of nesting elements can be included on the end surfaces of the ink sticks. The ink sticks can have non-cubic shapes. In certain circumstances, the nesting elements need not constrain vertical movement of the ink sticks relative one another. A substantial portion, or all, of the end surfaces of the ink sticks can be used to provide the nesting shapes for the ink sticks. Therefore, the following claims are not limited to the specific embodiments described and shown above.

We claim:

1. An ink stick for use in a solid ink feed system of a phase change ink jet printer, the ink stick comprising:

a body having opposed first and second opposed end surfaces;

wherein the first and second end surfaces have complementary nesting shapes so that the first end surface of a first ink stick nests with the second end surface of an adjacent second ink stick of substantially the same shape as the first ink stick to limit movement of the first and second ink sticks relative to one another.

2. The ink stick of claim 1, wherein:

the first surface has a first nesting element; and the second surface has a second nesting element; and the second nesting element has a shape that is complementary of the shape of the shape of the first nesting element.

3. The ink stick of claim 2, wherein:

the ink stick body comprises at least first and second separate ink stick body sections;

the first ink stick body section contains at least a portion of the front surface; and the second ink stick body section contains at least a portion of the rear surface.

4. The ink stick of claim 2, wherein:

the ink stick body comprises at least first and second separate ink stick body sections;

the first ink stick body section contains at least a portion of the first nesting element; and the second ink stick body section contains at least a portion of the second nesting element.

5. An ink stick for use in a solid ink feed system of a phase change ink jet printer, the ink stick comprising:

an ink stick body having:

first and second side surfaces; and first and second end surfaces;

wherein:

the first end surface is between the first and second side surfaces;

the second end surface is between the first and second side surfaces;

the first end surface has at least one first end surface protrusion from the first end surface;

the first end surface protrusion has a position on the first end surface relative to the first and second side surfaces;

the second end surface has at least one second end surface recess into the second end surface;

the second end surface recess has a position relative to the first and second side surfaces; and the position of the first end surface protrusion with respect to the first and second side surfaces corresponds to the position of the second end surface recess with respect to the first and second side surfaces so that when the ink stick is positioned in an ink stick feed channel adjacent a second identical ink stick with the second end surface of the first ink stick abutting the first end surface of the second ink stick, the protuberance from the second end surface of the first ink stick fits into the indentation in the first end surface of the second ink stick.

6. The ink stick of claim 5, wherein the position of the first end surface protrusion with respect to the first and second side surfaces corresponds to the position of the second end surface recess with respect to the first and second side surfaces so that when the ink stick is positioned in an ink stick feed channel adjacent a second identical ink stick with the second end surface of the first ink stick abutting the first end surface of the second ink stick, the side surfaces of the first and second ink sticks are aligned with one another.

7. The ink stick of claim 6, wherein:

the ink stick body additionally has a bottom;

the protrusion from the first end surface additionally has a position relative to the bottom;

the recess in the second end surface additionally has a position relative to the bottom; and the position of the first end surface protrusion with respect to the bottom corresponds to the position of the second end surface recess with respect to the bottom so that when the ink stick is positioned adjacent a second identical ink stick with the second end surface of the first ink stick abutting the first end surface of the second ink stick, and the bottoms of the first and second ink sticks aligned with one another.

8. The ink stick of claim 7, wherein:

the bottom of the ink stick body is defined by a bottom surface;

the ink stick body additionally comprises a top surface substantially opposed to the bottom surface; and the first and second opposed sides are defined by one or more side surface segments.

9. The ink stick of claim 8, wherein:

the one or more side surface segments of the first and second side surfaces connect the top and bottom surfaces;

the side surface segments of the first and second side surfaces connect the first and second end surfaces; and the side surface segments of the first and second side surfaces are substantially perpendicular to the first and second end surfaces.

10. The ink stick of claim 9, wherein:

the first end surface is a rear end surface; and the second end surface is a front end surface.

* * * * *